United States Patent [19]

Schroeder et al.

[11] 4,249,517
[45] Feb. 10, 1981

[54] COMPOSITE MOLDED ARTICLE AND METHOD OF MAKING THE SAME

[76] Inventors: Lawrence E. Schroeder, Getzville; Carlton M. Burgess, Lockport, both of N.Y.

[21] Appl. No.: 877,188

[22] Filed: Feb. 13, 1978

Related U.S. Application Data

[63] Continuation-in-part of Ser. No. 805,412, Jun. 10, 1977, abandoned.

[51] Int. Cl.³ .................................................. F24J 3/02
[52] U.S. Cl. ............................... 126/450; 126/447; 264/46.4; 264/46.9; 264/274; 52/309.4; 52/400; 52/823; 156/109
[58] Field of Search ............... 126/270, 271, 450, 442, 126/446, 447; 237/1 A; 428/81, 83, 38, 34, 192, 310, 313; 264/46.4, 46.9, 271, 274, 279, 275; 52/309.4, 823, 400; 425/4 R; 156/109

[56] References Cited

U.S. PATENT DOCUMENTS

| 2,733,789 | 2/1956 | Tolle | 52/400 |
|---|---|---|---|
| 4,010,733 | 3/1977 | Moore | 126/271 |
| 4,048,981 | 9/1977 | Hobbs | 126/271 |
| 4,089,324 | 5/1978 | Tjaden | 126/271 |

FOREIGN PATENT DOCUMENTS 1945291 5/1971 Fed. Rep. of Germany ......... 264/46.4
1347255 2/1974 United Kingdom .

OTHER PUBLICATIONS

"RIM-Urethane Solar Panel", Carl M. Burgess, *Plastics Machinery & Equipment*, Jul. 1979, pp. 11 and 12.
"Baydur Structural Foam", Mobay Chemical Corp., 1977.

*Primary Examiner*—Carroll B. Dority, Jr.
*Assistant Examiner*—Lee E. Barrett

[57] ABSTRACT

A composite glass and molded frame member. In a specific embodiment, one or more glass panels may be utilized in association with a generally U-shaped elastomeric packing and mold-piece seal strip with thin leg portions engaging the glass. The strip has a collapse or compression zone formed outboard and adjacent the edge portion of the glass to accommodate, inter alia, differing thermal expansions and contractions of the glass and the frame. The glass edge and strip are unitary with a perimeter frame of urethane plastic material which is molded over the glass edge and seal. The mold pieces of the molding apparatus have continuous raised or ridge portions adapted to engage the leg portions of the elastomeric strip on either side of the glass panel to prevent flow of plastic material over the glass surface area encircled by the ridge portions of the mold pieces.

6 Claims, 12 Drawing Figures

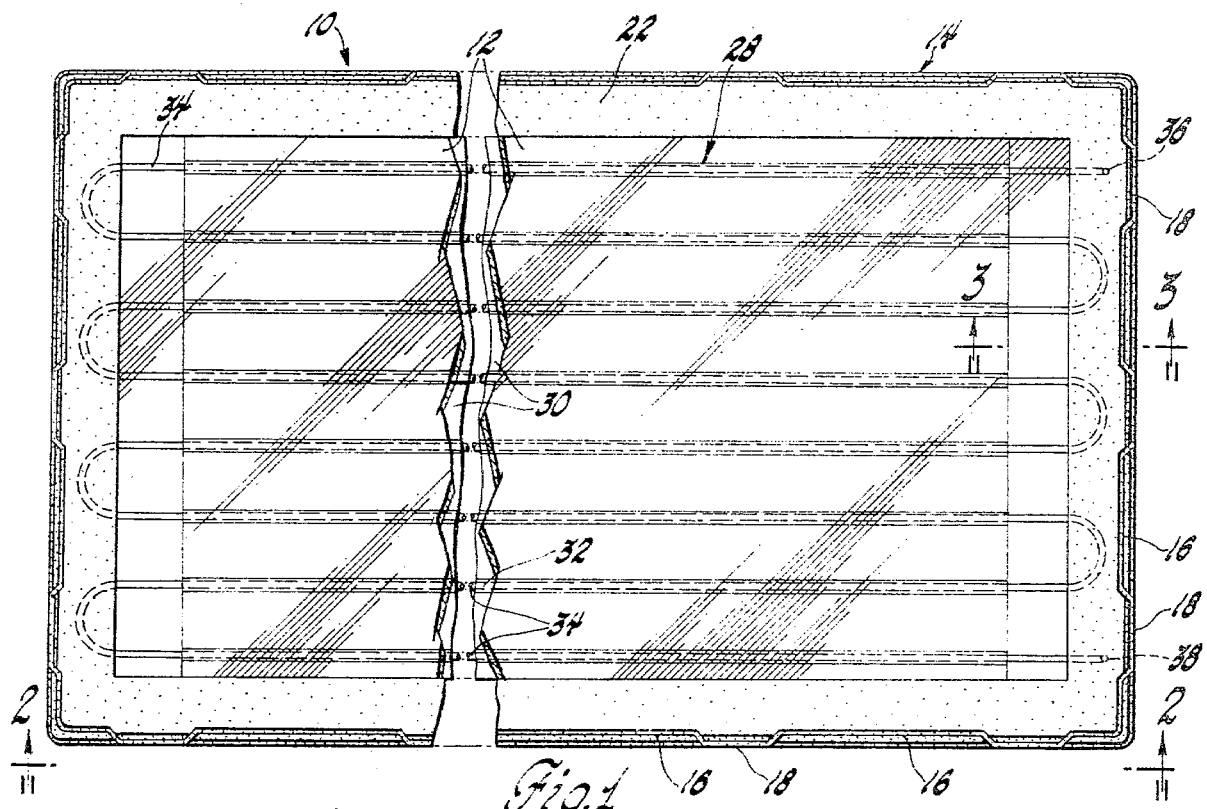
Fig. 1
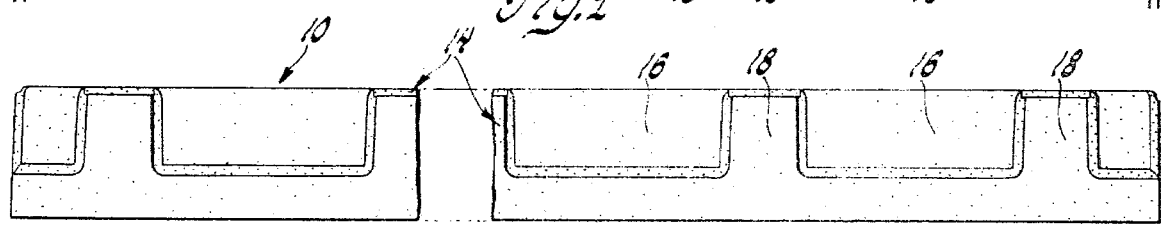
Fig. 2
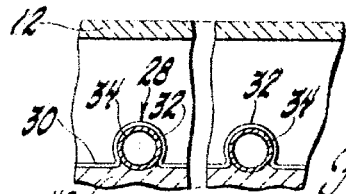
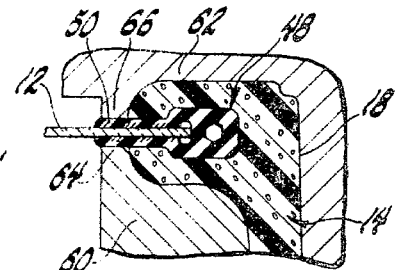
Fig. 5
Fig. 6
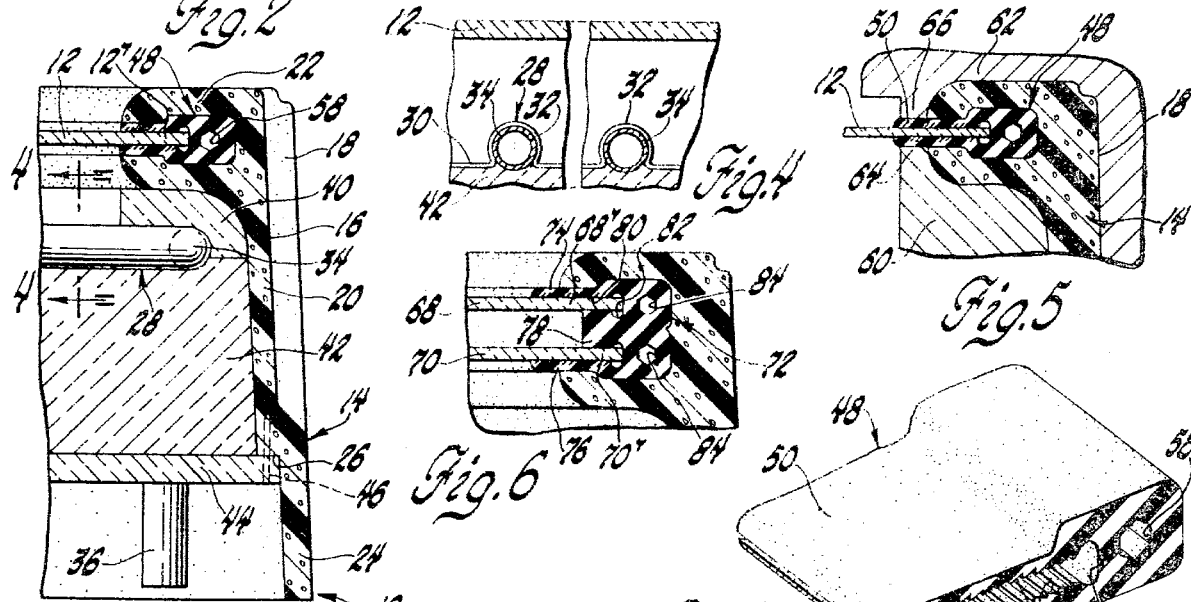
Fig. 3
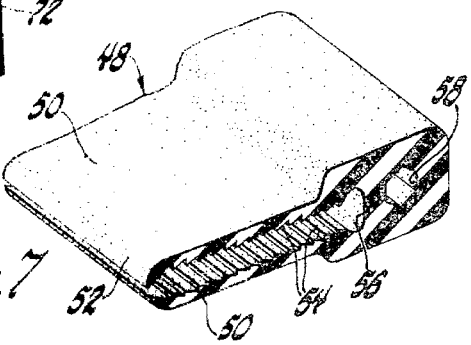
Fig. 7

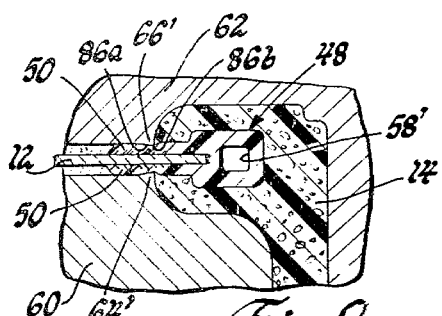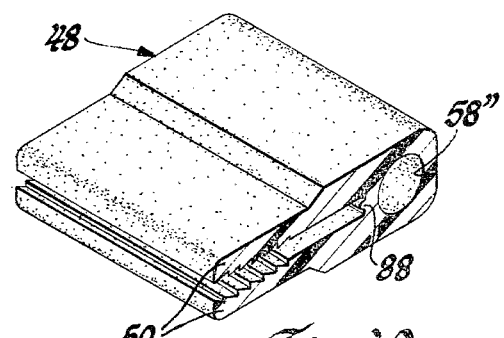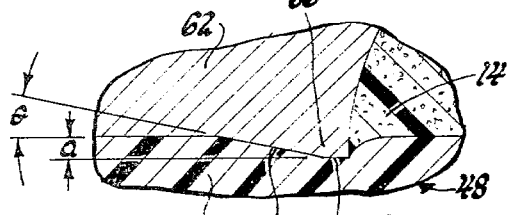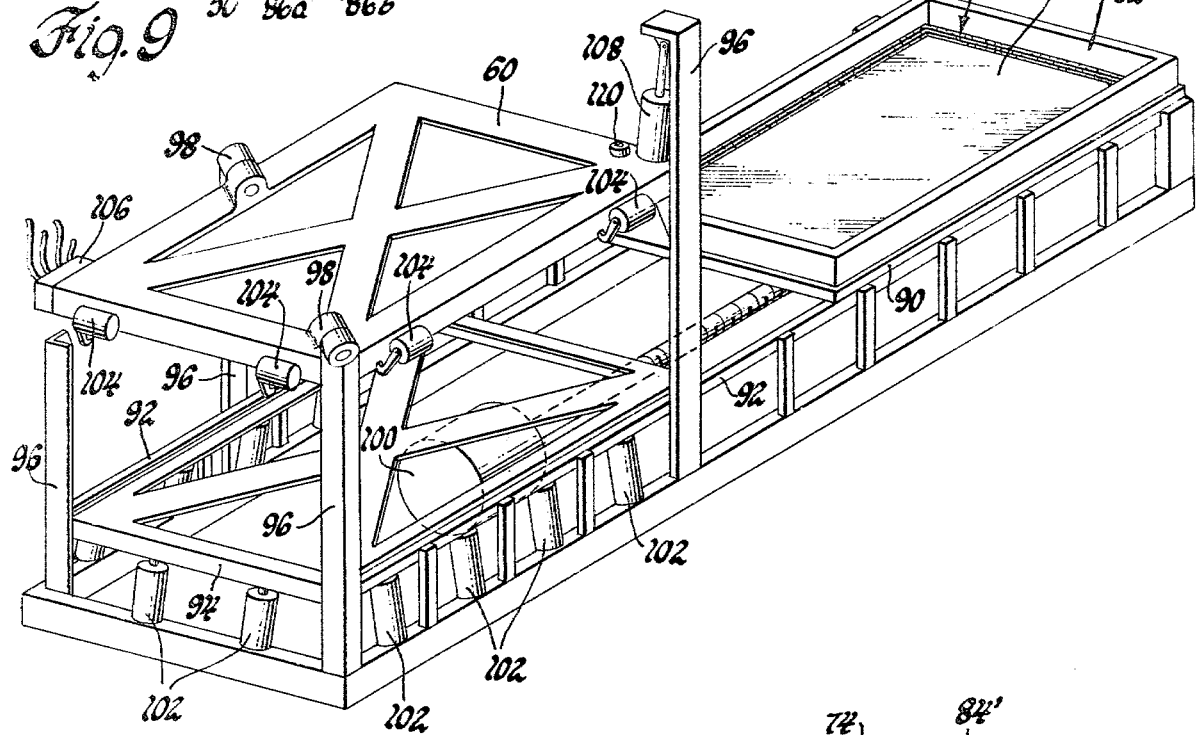

COMPOSITE MOLDED ARTICLE AND METHOD OF MAKING THE SAME

This is a continuation-in-part of Ser. No. 805,412, filed June 10, 1977, now abandoned, and assigned to the assignee of the present invention.

This invention relates to the mold-forming of articles and more particularly to the manufacture of composite articles including a unitary glass and frame mold-formed about the edge of the glass.

While the invention has an abundance of applications, a use that has been of immediate importance has been in the development of solar collector or heater units, and the description of the invention will proceed with particular reference thereto. The advantages which will be pointed out in the context of that limited use will be seen as only a partial list and of broader significance in such fields as windows and other building products, furniture, etc.

Prior solar collector assemblies have utilized various framing devices for mounting glass and a solar heat collector plate. The framing devices have been associated with single or multiple layers of glass in spaced relation to the collector plate to admit solar energy thereto while preventing heat loss from the collector plate to the atmosphere. Some materials utilized for solar collector framing have included wood and metal, particularly aluminum. Various fastening means for the glass to the frame connection have been tried, including the use of adhesives or cement and the use of various gasket members. Although these materials and methods have worked successfully, it is believed that the subject disclosure of a unitary glass and frame member made by molding represents an advantageous and highly desirable advance in the art. The advantages are to be discussed hereinafter. First, however, some of the disadvantages of the aforementioned earlier materials and methods will be discussed.

The use of metal or wood frames normally involves joining together a plurality of parts which must be assembled in fairly accurate relation to one another to mount a glass panel or panels therein. The labor cost in forming this assembly will be quite significant and when larger volume production is contemplated, the labor cost in assembling wood and metal frames becomes quite excessive. Some materials, such as wood, do not provide sufficient durability and there are associated maintenance expenses. The use of a metal, such as aluminum, for a frame out-of-doors or in building exteriors may permit significant heat losses due to the high thermal conductivity of the material. In an attempt to lessen the effect of heat loss through the metal, insulation may be required about the glass edge and thus the unit dimensions will be increased in relation to the solar heat collecting area.

A unitary glass and frame member made in accordance with the invention is readily molded in a single operation to produce an economical and useful structure which has many desirable features. A perimeter frame of urethane material serves to protect the glass panel or panels from shock-related breakage and provides with the glass an electrically nonconductive assembly. The frame provides an enclosed space adjacent and below the glass panel to receive a solar collector surface and associated insulation. The wall encircling the glass panel may be tapered outward so that a multiple of the glass and frame members may be stacked in cuplike fashion one upon another prior to insertion of the associated solar heat collector parts. Urethane material has very good durability and the maintenance required is low. Unlike metals, such as aluminum, urethane does not have corrosion problems and unlike wood, the urethane material does not rot and require painting. Urethanes generally, and in the so-called structural foam variations particularly, have very beneficial thermal insulative properties for this and like uses. In fact, it is readily seen that the various advantages just listed commend the article of the present invention to many uses other than solar collectors.

In a particularized practice of the invention, a unitary glass and urethane frame member is inexpensively manufactured in large volumes by the application of the known reaction injection molding process, also known as liquid injection molding. Specifically, urethane components are mixed and injected into a closed mold. The pressures in the mold are relatively low when compared to the more commonly utilized injection molding for thermosetting or thermoplastic materials in which mold pressures may range from 10,000 to 20,000 pounds per square inch. In reaction injection molding, the pressures in the mold are typically below about 75 pounds per square inch. These low mold pressures permit molding of relatively large assemblies, such as in the present application, without the need for an enormous molding machine or super rigid dies. By way of example only, the glass panels of a preferred embodiment measure approximately 34 inches by 92 inches and the outer dimensions of the frame measure about 38.4 inches by 96.4 inches. The frame width is about 3 inches and this translates into a parting area between mold pieces of almost 800 square inches. With mold pressures of about 75 pounds per square inch, the clamping force need would equal about 60,000 pounds. Thus, a relatively light 30-ton press would be sufficient.

In general, a glass panel and frame member according to the invention is manufactured as follows. A generally U-shaped elastomeric packing and mold-piece seal strip is first provided about the outer edge of the glass panel. The leg portions of the strip extend along the surface of the glass and inward toward its midportion. The glass panel with the strip thereon is placed in a mold cavity of molding apparatus and, specifically, with one of the strip legs resting upon an upstanding ridge-like projection of one mold piece, which projection extends continuously inboard the edge of the glass panel. Then the corresponding upper half or piece of the molding apparatus is brought into operative relationship with the first mold piece. It, too, has a continuous ridge-like projection to engage the opposite leg of the seal. This forms a closed mold space about the edge of the glass and seal into which the urethane material is injected to result in a composite article having a frame mold-formed around the edge of the glass.

These and other advantages and features of the present invention will be more readily apparent from an understanding of the following detailed description, reference being had to the accompanying drawings in which preferred embodiments of the unitary glass and frame are shown.

In the drawings:

FIG. 1 is a plan view of a solar collector unit including a unitary glass and frame member, all according to the present invention;

FIG. 2 is a view looking in the direction of arrows 2—2 in FIG. 1;

FIG. 3 is an enlarged sectional view taken along section lines 3—3 in FIG. 1;

FIG. 4 is a fragmentary sectioned view taken along section lines 4—4 in FIG. 3 and looking in the direction of the arrows;

FIG. 5 is a partial edge view of the glass and frame member as situated between mold pieces immediately subsequent to injection of plastic material into the mold cavity;

FIG. 6 is a fragmentary sectioned view of a second embodiment showing the frame edge and a dual glass panel and strip;

FIG. 7 is a perspective view of the particular elastomeric strip utilized on the glass panel of FIG. 3;

FIG. 8 is a fragmentary view similar to FIG. 5 showing alternative molding apparatus and an alternative U-shaped strip;

FIG. 9 is an enlarged view of a portion of FIG. 8;

FIG. 10 is a perspective view similar to FIG. 7 showing an alternative U-shaped strip;

FIG. 11 is a perspective view illustrating molding apparatus suitable to the present invention; and FIG. 12 is another view similar to FIG. 6 showing an alternative strip for a dual glass panelled article.

In FIGS. 1 and 2, there is illustrated a solar collector or heater unit including a unitary glass and frame member 10, all in accordance with the present invention. The member 10 includes a glass panel 12 which preferably is of a convenient modular size. The glass panel 12 is encircled by a perimeter frame 14 mold-formed of urethane or like polymeric material.

Details of the shape of frame 14 are apparent in FIGS. 1-3 which disclose the wall-like frame with indented wall portions 16 and rib-like portions 18. This configuration may obviously take many forms without departing from the scope of the present invention. The illustrated configuration of frame 14 is adapted to impart rigidity to the frame. As best shown in FIG. 3, frame 14 is molded about the outer edge portion 12' of the glass panel 12. A wall portion 20 extends substantially normal to the plane of the glass panel 12 from the portion 22 about the glass edge 12'. Integrally formed therewith and continuous with the wall portion 20 is a slightly outboard second wall portion 24. The juncture between wall portions 20 and 24 forms a shoulder 26. The wall portions 20 and 24 encircle a space adjacent and below the glass surface of panel 12 in which a solar heat exchanger or collector panel assembly 28 is supported. In FIGS. 1, 3 and 4, particularly, the collector panel assembly 28 is shown and includes a substantially flat collector plate 30 of aluminum or other material having a high thermal conductivity. The plate 30 has a series of parallel crimped portions 32 adapted to partially encircle lengths 34 of a copper or like material conduit or pipe. Such pipe is bent into a serpentine pattern as best shown in FIG. 1. One end 36 is directed downward toward the bottom of the frame 14 to form a fluid inlet while the other end 38 forms the fluid outlet. Liquid is pumped through the continuous copper conduit to transfer heat from the plate 30. As shown in FIG. 3, the collector panel assembly 28 including plate 30 and copper conduit 34, is held along the frame edge between a narrow upper blanket of insulation 40 and a lower blanket of insulation 42. The collector panel assembly 28 and insulation 42 is supported at its bottom by a thin panel 44 of board-like insulative material. The edge of panel 44 engages the shoulder 26 and is attached by means of staples 46. The solar collector panel assembly 28 may take many forms and in the present description of the application of the invention to solar collector units it is not intended to limit the use of the unitary glass and frame member to any particular collector configuration.

Engaging the outer edge portion 12' of glass panel 12 is a rectangular planned strip 48 of generally U-shaped cross section as best shown in FIGS. 3, 7. The strip 48 is preferably a single integral unit, made of elastomeric material, and includes relatively thin laterally extending leg portions 50 which when the strip is stretched and mounted over glass edge portion 12' will snugly engage the surfaces of such edge portion all around panel 12. As best shown in FIG. 7, the leg portions 50 have a thin cross section and a rounded inboard end 52. On the inside surface of the leg portions are a series of ridges 54. These are felt to aid in accommodating any dimensional variations and their effects on the molding process, as will appear. At the base of the leg portions and outboard from the ridges 54 is located, in one form, an enlarged bottom portion 56 into which the outer edge portion of the glass panel 12 may extend. Still further outboard from the bottom portion 56 is located, by way of preferred form of a collapse zone, a cavity 58 with, in this particular illustration, a hexagonal configuration and continuously around the associated glass panel.

The outboard cavity 58 provides a space or zone to prevent undue stress from developing caused by differing expansion characteristics of the glass panel 12 and the surrounding frame 14. Specifically, it has been found that in any attempt to mold-form a composite article having a polymeric or like material frame around a glass panel, the post-mold shrinkage which generally occurs with mold polymers, and even in nonpolymeric moldable materials, will place severe stresses within the article resulting in fractures thereof, particularly the glass, while curing or during handling. The bodily contraction of the urethane element, frame 14, relative to the glass must be accommodated without producing substantial force or stress. In accordance with one aspect of the invention, the strip 48 is provided with a collapsible or compression zone outboard of the terminal edge of glass edge portion 12', as seen, for example, in FIG. 3, generally continuously around glass panel 12, and particularized there in the form of cavity 58. The zone defined by this cavity enables post-mold relative movement of the contracting polymeric frame 14 with respect to the glass panel without any substantial resulting stress, since the cavity 58 readily permits volume reduction directly within the body of strip 48 under relatively light force. The strip member 48 is thus seen as being in the nature of a packing element which is firm for intimate molding of frame 14 about the strip member over glass edge portion 12', and yet provides a relatively soft compliance function to achieve the advantages set forth above.

The strip 48 with its collapse zone also accommodates differential thermal expansion and contraction between the glass 12 and the frame 14 during use of the solar collector unit. An iron-free tempered glass of the type used in one preferred embodiment of the solar collector unit normally has a coefficient of linear expansion of about $4.7 \times 10^{-6}$ inches per inch per degree Fahrenheit. A urethane material used in this same embodiment for frame 14 and having an average specific gravity of about 0.55 has a linear expansion coefficient of about $40 \times 10^{-6}$ inches per inch per degree Fahrenheit. Thus, the linear expansion (and wherever herein that term is used, contraction is also implied) of the glass per degree temperature change is substantially less than the expansion and contraction of the surrounding urethane frame. With increasing temperatures, the urethane frame will enlarge more than the glass panel and with decreasing temperatures, the urethane frame 14 will shrink in dimension more than the glass. Consequently, assuming for the moment the absence of strip 48 and the glass edge 12' thus being embedded directly within a full thickness of the material of frame 14, even slight temperature changes in a large composite article of this type, (or, of course, substantial temperature changes in even small articles) would create extreme stresses within the two elements of the composite article which, it has been found, the glass particularly cannot tolerate without breaking. The collapsing zone of the strip 48, again, provides the necessary compliance to relative movement that eliminates the creation of destructive stresses.

Referring now to the process in detail, FIG. 5 illustrates first and second mold pieces 60, 62 which when brought together on either side of the glass panel 12 and strip 48 form a cavity into which moldable material is then injected to form the peripheral urethane frame 14. In the particular cross section shown in FIG. 5, the midportion of a ridge 18 is illustrated. Both mold members 60, 62 have projecting narrow ridge-like projections 64, 66 which are continuous along the seal and prevent the flow of the molded material out of the cavity and onto the surface of the midportion of glass 12. Such flow of the molded material onto the glass can be particularly destructive when, for example, the molded material is a urethane or like polymer which can adhere strongly to the surface of the glass. Any leakage of the urethane out of the mold cavity and onto the glass would thus require scrapping of the article or a urethane removal technique elaborate enough to leave the glass surface unimpaired. Accordingly, another aspect of this invention is in the use of a strip member which serves as a mold-piece seal providing a dam which prevents such material flow onto the panel element of the composite article during molding. It is highly advantageous to combine such a mold-piece sealing function directly within the strip 48 so that strip 48 alone serves the two functions of compliance of relative movement and mold-piece sealing.

Thus, returning to the cross sectional view of FIG. 5, the process entails, in a preferred version, the mounting over glass edge portion 12' of a combined-function strip 48 of such configuration in section as to have laterally extending legs, such as 50, project a distance inboard of the terminal edge of the glass as shown so as to be engageable by mold piece ridge projections, such as the narrow projections 64 and 66 at the edges of the mold cavities of the mold pieces 60 and 62. During the process, and with the mold pieces 60 and 62 at first separated, the mold piece 60 (or 62 if it be the lower one) lies open to receive directly in its mold cavity the panel 12 with the strip 48 thereon. The glass panel 12 would be laterally adjusted in all directions within such mold cavity to have the lower leg 50 of strip 48 resting upon ridge projection 64 all around such ridge as in the relation seen in FIG. 5. The mold piece 62 would then be brought generally into the molding relationship shown in FIG. 5 and in which the upper ridge projection 66 engages the upper leg 50 of strip 48. A final closing movement is then applied to the mold pieces to bring them closer together in such manner as to deform the thickness of legs 50 at the narrow regions throughout the length thereof which are engaged by the ridge projections 64 and 66. This amounts to a highly localized squeezing of the legs causing material flow thereof from under and to around the ridge projections so that the result is a substantial pressure-proof fluid dam preventing flow of the molded material out of the cavity onto the midportion of glass panel 12, all as viewed in FIG. 5. A particularized specification for such deformation will be set forth in connection with another Figure hereinafter.

It should be noted that after the mold pieces 60, 62 are removed and the frame is exposed, the projecting inboard end portions 52 of the legs 50 are trimmed flush with the edge of frame portion 22. This trimming serves two purposes. First, the trimming away of the leg portions provides a greater glass area for entry of solar energy. Secondly, the trimming prevents water and foreign particles from getting between the glass and the inside surface of the leg portions.

As mentioned hereinabove, advantage is had in the combining within strip 48 of both the relative movement compliance and mold-piece sealing functions. However, a highly specialized strip 48 necessarily results since the two functions conflict with one another when strip material is considered. For example, a foam or sponge elastomer material or even a nonelastomer strip with suitable collapsible structure, could be satisfactory for the movement compliance function, but would be unacceptable as a mold-piece seal. A high durometer elastomer material could be satisfactory for sealing purposes but, without special provisions, would generally not itself allow relative movement under shrinkage or temperature growth without developing high forces in the glass. Accordingly, as yet another more specific aspect of this invention, an elastomer strip 48 serving both functions is fabricated through extrusion to have a generally U-shaped configuration such as seen generally in FIGS. 5 and 7, is provided with a compression zone such as cavity 58, and has a material specification in which a key element is material hardness generally in the medium to medium-firm durometer range of from about 40 to 60. Satisfactory material hardness and other factors are present, for example, in an EPDM rubber strip material having a specification according to the following code of the American Society of Testing and Materials:

| ASTM D 2000 | 2 CA 515 B 44 F 17Z₁ |
| --- | --- |
| Grade 2 rubber | |
| Durometer (hardness) | 50 ± 5 |
| Tensile strength | 1500 psi |
| Compression Set | 35% max. in 70 hrs. @ 100° C. |
| Cold Temprature Flex | −40 F. |
| Ozone and Heat Aged | |

FIG. 6 illustrates a fragmentary view of a second embodiment showing a unitary glass and frame structure with dual glass panels. The glass panels 68, 70 have an integral generally single-E-shaped strip 72 slipped over glass edge portions 68', 70'. The strip 72 has a leg portion 74 which extends along the outer surface of the outer glass panel and a leg portion 76 extending along the bottom surface of the inner glass panel. A midportion or web 78 projects slightly between glass panels to space them and supports the panels 68, 70. Otherwise, the strip 72 is similar to seal 48 and it includes ridged inner surfaces 80, enlarged end portions 82, and cavities 84. The molding operation is similar to that described in association with FIG. 5. The projecting portions of the mold pieces engage inboard portions of legs 74, 76 to prevent flow of molded material over the glass surface.

The midportion 78 of this E-type of the generally U-shaped strip is a feature of another aspect of this invention. It has been found possible to mold this dual glass composite article, despite the great inherent susceptibility to breakage of the glass panels for lack of proper support in the mold pieces, if the midportion 78 projects inboard a distance generally about as great as does the inner terminal edge of the frame 14; i.e., generally equal to the trimmed length of legs 74, 76. The length of midportion 78 illustrated in FIG. 6 is somewhat short of that, and is about the limit of shortness which such midportion should have to properly support the glass edge portion 74' and 76' within the mold pieces. It preferably should not extend beyond such inner terminal edge so as to occlude the glass panel area or provide unsightly interspace between glass panels. In any event, firmness of durometer for strip 72, such as suggested hereinabove, provides a midportion 78 sufficiently rigid to support the glass panels inside the mold-piece cavities and offer that resistance necessary to the pinching pressure of the mold-piece ridge projections for mold-piece sealing.

The particular embodiment shown in FIG. 6 would be applicable for use in northern climates, where the double glass panel provides extra insulation to prevent undue heat loss due to severe wind effects. It should be noted that in FIG. 6, the inboard ends of the legs 74, 76 have not yet been trimmed flush with the frame. Trimming of this portion will provide more glass area for passage of solar energy. A third or more solar glass panels might be provided, and a multiple E-shaped strip would serve to suitably stack such multiple panels.

As indicated hereinabove, urethane material has been found quite suitable to the solar collector application of the invention described herein. Specifically, reaction injection molding, also known as liquid injection molding, is advantageous to this application in that low mold pressures are utilized and solar collector units are preferably of such large size that pressures can be a limiting factor when tooling expense is of concern. Further, that process enables the use of urethane or like polymer materials introduced with a foaming agent for the purpose of achieving a so-called structural foam having a relatively low density core but a high density outer skin region. Such a urethane frame provides a rigid support for the solar collector unit shown in FIGS. 3 and 4, yet the side walls 20, 22 of the urethane frame may have excellent insulative properties, with a conductivity factor of only about 0.55 when the overall specific gravity of the urethane frame is also about 0.55. To arrive at the aforesaid overall specific density of about 0.55, the molding charge specifications and mold cooling requirements are set to produce an outer skin having a density of about 65 pounds per cubic foot, while the midportion of the thick wall sections has a density of only about 2 pounds per cubic foot. Thus, it can be seen that the range of densities varies greatly and this is an advantageous factor in producing a strong and lightweight frame with good insulative properties.

FIG. 8 illustrates details of mold-piece design alternative to that illustrated in FIG. 5. Rather than the narrow generally rectangular ridges with flat surfaces of that Figure, the mold pieces 60 and 62 may incorporate corresponding projections 64' and 66' of a sloping ledge configuration merging with the edge of the mold cavity of each mold piece. The two sloping projections are preferably identical in detail and each includes, as best illustrated in the enlarged FIG. 9, a sloping wall 86a directed outwardly to merge with a very narrow (0.060 inches or so) land 86b at the edge of the mold cavity. The inboard extremity of wall 86a merges with the generally horizontal flat base surface of the mold piece. It has been found that the slope of the projection wall 86a is best made shallow, the angle $\theta$ between it and the flat base wall as shown in FIG. 9 being kept in a range of around 10°, particularly when the medium to medium-firm durometer elastomer is used for strip legs 50.

As set forth above in the detailed process description, the final closing movement of mold pieces 60 and 62 into final molding relationship is intended to cause the ridge projections of the mold pieces to deform the legs 50. When using the sloped projections of FIG. 8, a depth of penetration of each projection into a leg 50—dimension "a" of ridge 66' in FIG. 9—of about 0.02 inches has been found to produce the desired result. Thus, with an illustrative total normal thickness of glass panel 12 and strip legs 50 either side thereof of about 0.397 inches, final closing movement of the mold pieces after initial engagement of surface 86b with either leg 50, to bring the final gap between the two surfaces 86b to about 0.357 inches, will afford that degree of material flow in legs 50 around the sloping projections to create the fluid dam. An alternative cavity 58' for strip 48 of a rectangular configuration in FIG. 8 illustrates the choices available.

FIG. 10 shows yet another configuration for strip 48 in which enlarged end portions 82 are eliminated in favor of fully flat inner surfaces inside legs 50 merging with a bottom portion provided with an arcuate section sealing rib 88 running the length of strip 48. The flat inside leg surfaces may aid in eliminating cocking of the strip 48 on the glass edge during mold process or otherwise. The rib 88, particularly under post-mold shrinkage of the frame 14, will tightly engage the terminal glass edge and aid in providing a moisture seal preventing migration of water or foreign matter from the exterior to underneath the glass panel 12. A completely circular form of cavity 58" is illustrated in FIG. 10.

FIG. 11 illustrates a mold apparatus which has been found suitable to achieve the process steps outlined hereinabove, yet with relatively low cost and complexity. This apparatus features a slidable table 90 for one of the mold pieces and situated on guideways 92 of a floor-mounted structural frame, such guideways 92 extending lengthwise to straddle a liftable bed 94 at one end of the molding apparatus. Two vertical posts 96 of the structural frame support pivots 98 which mount the other mold piece and an integral reinforcing frame thereof. A hydraulic motor and screw drive 100 is employed for shifting the table 90 and one mold piece 62 over guideways 92. In use of the apparatus, a glass panel 12 with strip member 48 thereon is placed in the cavity of mold piece 62 on table 90, as shown. The screw drive 100 is actuated to reciprocate the table leftwardly from the position shown to overlie bed 94. A series of hydraulic jacks 102 are then energized to lift bed 94, with table 90 and mold piece 62 thereon, upwardly into molding relationship with the upper mold piece 60 mounted on the pivots 98. Final closing pressure between the mold pieces for strip squeezing may be derived from final movement of the hydraulic jacks 102, or by additionally actuating a series of rotary or like clamps 104 affixed to the upper mold piece 60 and engageable with a flange of mold piece 62 or table 90. Moldable material is introduced into the common mold cavity of the mold pieces 60 and 62 through an injecting and mixing head 106 incorporated at one end of the mold piece 60. Adjacent the other end, another hydraulic actuator 108 is affixed between the mold piece and a post 96 to selectively tilt the joined mold pieces about the axis of pivots 98. Thus, during injection of moldable material into the joined mold pieces, air may escape the tilted mold cavity through a single vent 110 adjacent actuator 108. Following molding and untilting, the rotary clamps are released, table 90 and mold piece 62 are lowered on bed 94, and then the table and mold piece are translated by the screw drive back to original position wherein the completed composite article may be removed from the mold piece 62.

FIG. 12 illustrates still another embodiment of a dual glass panel composite article for solar collector units or the like. Again, rectangular cavities 84' may be employed in lieu of hexagonal or circular shapes and it will be apparent that many other shapes of cavity may be found suitable. Also, partial curing or similar process expedients in the forming of elastomer strips 48 and 72 may lead to the utilization of soft or foam cores within the strips to substitute for fabricated cavities therewithin, yet with care not to sacrifice the hardness or stiffness needed in the areas of legs 50 or 74, 76 for mold-piece sealing. The midportion 78' illustrated in FIG. 12 for the strip 72 has the advantage of a rounded end facilitating initial mounting of the strip around the glass edges.

The embodiments of the invention in which an exclusive property or privilege is claimed are defined as follows:

1. In the class of articles mold-formed of material which exhibits shrinkage following molding or exhibits a linear expansion significantly different from that of glass, a composite article comprising, a glass panel, a packing strip mounted over the edge portion of said glass panel, and a perimeter supporting frame of the above-recited material mold-formed about said packing strip and glass edge portion, said packing strip having a collapsible zone formed of an inner region of greater softness than the remainder of said strip outboard of the terminal edge of said glass panel structured to be susceptible to forces in the plane of said glass panel to enable relative movement between the latter and said frame in such plane without substantial force during post-mold shrinkage of said frame or differential linear expansion thereof relative to said glass panel in use.

2. In the class of articles mold-formed of polymeric material which exhibits shrinkage following molding or exhibits a linear thermal expansion significantly different from that of glass, a composite article comprising, a glass panel, a packing strip of elastomeric material mounted over the edge portion of said glass panel, and a perimeter supporting frame of the above-recited class of material mold-formed about said packing strip and glass edge portion, said packing strip having a zone formed of an inner region of greater softness than the remainder of said strip outboard of the terminal edge of said glass panel readily compressible in volume under relative movement between the glass panel and said frame in the plane of said glass panel without substantial force during post-mold shrinkage of said frame or differential linear expansion thereof relative to said glass panel in use.

3. A composite molded article comprising, a glass panel, an elastomeric packing strip having laterally extending legs, said strip being mounted with its legs embracing the edge portion of said glass panel, and a perimeter frame of polymeric material mold-formed about said strip and glass edge portion, the legs of said strip completely intervening said frame and the glass panel throughout the perimeter of said frame, and said strip having a collapse zone formed of an inner region of greater softness than the remainder of said strip outboard of the terminal edge of said glass panel enabling relative movement between the latter and said frame in the plane of said glass panel without substantial force during post-mold shrinkage of said frame or differential linear expansion thereof relative to said glass panel during use of the article.

4. A composite molded article comprising, a glass panel, a generally U-shaped elastomeric packing strip mounted with its legs embracing the edge portion of said glass panel, and a perimeter frame of polymeric material mold-formed about said packing strip and glass edge portion, the legs of said strip being of a medium-firm durometer elastomer and completely intervening said frame and the glass panel throughout the perimeter of said frame, and said strip having a longitudinal cavity outboard of the terminal edge of said glass panel enabling relative movement between the latter and said frame in the plane of said glass panel without substantial force as during post-mold shrinkage of said frame or differential linear expansion thereof relative to said glass panel during use of the article.

5. A molded solar heat collector including a composite molded member, comprising, a glass panel, an extruded generally U-shaped elastomeric packing strip mounted with its legs embracing the edge portion of said glass panel, a perimeter frame of polyurethane material mold-formed about said packing strip and glass edge portion, the legs of said strip being of a medium to medium-firm durometer elastomer and completely intervening said frame and the glass panel throughout the perimeter of said frame, and said strip having extruded therein a longitudinal cavity outboard of the terminal edge of said glass panel enabling relative movement between the latter and said frame in the plane of said glass panel without substantial force as during post-mold shrinkage of said frame or differential linear expansion thereof relative to said glass panel during use of the collector, said frame including an enclosing wall portion extending generally normal to the plane of said glass panel, a heat collecting panel mounted within said wall portion adjacent to and below said glass panel and including conduit means through which fluid may be made to flow, and thermal insulation means within said wall portion.

6. In the class of articles mold-formed of polymeric material, a composite article comprising, at least two glass panels, a packing strip of elastomeric material mounted over juxtaposed edge portions of said glass panels, said strip having at least a single generally E-type cross section including a middle web interposed between each juxtaposed pair of edge portions of said glass panels and extending inboard a distance from the terminal edge of said edge portions, and a perimeter supporting frame of the above-recited material mold-formed about said packing strip and glass edge portions and extending inboard from the terminal edge of said edge portions a distance not substantially further than said web whereby said glass panels had and have adequate support from said web during molding process and in use.

* * * * *

UNITED STATES PATENT AND TRADEMARK OFFICE
CERTIFICATE OF CORRECTION

PATENT NO. : 4,249,517

DATED : February 10, 1981

INVENTOR(S) : Lawrence E. Schroeder & Carlton M. Burgess

It is certified that error appears in the above—identified patent and that said Letters Patent is hereby corrected as shown below:

Title page, column 1, insert -- Assignee: General Motors Corporation, Detroit, Michigan --.

Title page, column 2, insert -- Attorney: D. L. Ellis --.

Column 1, line 23, "The" should read -- These --.

Column 6, line 55, Table, "Temprature" should read -- Temperature --.

Signed and Sealed this

Twelfth Day of January 1982

[SEAL]

Attest:

Attesting Officer

GERALD J. MOSSINGHOFF

Commissioner of Patents and Trademarks